US009019254B2

(12) United States Patent
Chen et al.

(10) Patent No.: US 9,019,254 B2
(45) Date of Patent: Apr. 28, 2015

(54) DRIVING SYSTEM OF THREE-DIMENSIONAL LCD DEVICE, METHOD FOR DRIVING THE THREE-DIMENSIONAL LCD DEVICE, AND THREE-DIMENSIONAL GLASSES

(71) Applicant: Shenzhen China Star Optoelectronics Technology Co., Ltd., Shenzhen (CN)

(72) Inventors: Yinhung Chen, Shenzhen (CN); Yuyeh Chen, Shenzhen (CN); Liangchan Liao, Shenzhen (CN)

( * ) Notice: Subject to any disclaimer, the term of this patent is extended or adjusted under 35 U.S.C. 154(b) by 106 days.

(21) Appl. No.: 13/982,490

(22) PCT Filed: May 28, 2013

(86) PCT No.: PCT/CN2013/076323
§ 371 (c)(1),
(2) Date: Jul. 30, 2013

(87) PCT Pub. No.: WO2014/048125
PCT Pub. Date: Apr. 3, 2014

(65) Prior Publication Data

US 2014/0104255 A1 Apr. 17, 2014

(51) Int. Cl.

| | |
|---|---|
| ***G09G 3/36*** | (2006.01) |
| ***G06F 3/038*** | (2013.01) |
| ***G09G 5/00*** | (2006.01) |
| ***G09G 3/00*** | (2006.01) |

(52) U.S. Cl.
CPC .................. *G09G 3/36* (2013.01); *G09G 3/003* (2013.01); *G09G 3/3611* (2013.01); *G09G 2310/0248* (2013.01); *G09G 2320/0252* (2013.01); *G09G 2340/0435* (2013.01)

(58) Field of Classification Search
CPC . G09G 3/36; G09G 3/003; G09G 2340/0435; G09G 2310/0248; G09G 2320/0252; G09G 3/3611
USPC .......................................................... 345/208
See application file for complete search history.

(56) References Cited

U.S. PATENT DOCUMENTS 7,666,096 B2 * 2/2010 Novelo .......................... 463/30

FOREIGN PATENT DOCUMENTS

| | | | |
|---|---|---|---|
| CN | WO2010091113 | A2 | 8/2010 |
| CN | 102098523 | A | 6/2011 |
| CN | 102163407 | A | 8/2011 |

OTHER PUBLICATIONS

Li Jun, The International Searching Authority written comments, Oct. 2013, CN.

* cited by examiner

*Primary Examiner* — Charles V Hicks

(57) ABSTRACT

A system and method for driving a three-dimensional liquid crystal display (3D LCD) device uses a target frequency, where the target frequency is double of a monocular frequency of an input picture of the 3D LCD device, and the monocular frequency is in the range of 62 Hz-118 Hz. The system and method converts a frame rate of the input picture of the 3D LCD device into (62 Hz-118 Hz)×2, and monocular frequency through the 3D glasses is in the range of 62 Hz-118 Hz.

17 Claims, 5 Drawing Sheets

DRIVING SYSTEM OF THREE-DIMENSIONAL LCD DEVICE, METHOD FOR DRIVING THE THREE-DIMENSIONAL LCD DEVICE, AND THREE-DIMENSIONAL GLASSES

TECHNICAL FIELD

The present invention relates to the field of liquid crystal displays (LCDs), and more particularly to a driving system of a three-dimensional (3D) LCD device, a method for driving the 3D LCD device, and three-dimensional glasses.

BACKGROUND

Due to the low energy consumption and small volume of liquid crystal display (LCD) devices, they are widely welcomed by consumers.

A typical three-dimensional-shutter (3D-shutter) panel usually uses a frame rate of 100 Hz or a frame rate of 120 Hz, corresponding to a switching frequency of 50 Hz or 60 Hz for 3D glasses. However, because wave frequency of ambient light is actually 50 Hz or 60 Hz, users may experience strong flickering because of combination of 3D (monocular) transmittance waveform and ambient light waveform (FIG. 1 is a diagram of combination of a 3D panel of monocular frequency of 60 Hz and ambient light of 60 Hz).

SUMMARY

In view of the above-described problems, the aim of the present disclosure is to provide a driving system of a three-dimensional liquid crystal display (3D LCD) device, a method for driving the 3D LCD device, and three-dimensional glasses capable of reducing crosstalk.

The purpose of the present disclosure is achieved by the following methods:

A method for driving the 3D LCD device, comprising:

driving an LCD panel of the 3D LCD device using a target frequency, the target frequency being double of a monocular frequency of the input picture of the 3D LCD device, and the monocular frequency being in the range 62 Hz-118 Hz.

Furthermore, the method for driving the 3D LCD device comprises: converting a frame rate of the input picture of the 3D LCD device into the target frequency. The present disclosure may convert the different frame rate into the target frequency, thereby improving usefulness.

Furthermore, monocular frequency of the input picture of the 3D LCD device directly received by a display driver module of the 3D LCD device is in the range of 62 Hz-118 Hz, and the LCD panel is directly driven when the monocular frequency is in the range of 62 Hz-118 Hz. Thus, the display driver module (e. g. a driving circuit of time frequency, and the like) does not convert frequency of an input signal, thereby improving response speed of the display driver module.

Furthermore, the monocular frequency is in the range of 62 Hz-72 Hz. If a low voltage differential signaling (LVDS) is unchanged in typical conditions, maximum frame rate is about 72*2 Hz, thus when the frame rate is controlled within the range of (62 Hz-72 Hz)×2, crosstalk is reduced without increasing hardware costs.

Furthermore, the monocular frequency is 65 Hz and the exemplary target frequency is 65 Hz. As two commonly used frequency types in the prior art are 50 Hz and 60 Hz. For 50 Hz, only one frame picture is compensated for each three frames. For 60 Hz, only one frame picture is added behind each eleven frames. For 65 Hz, a smaller integer interval is used. To match the two main types, fewer pictures are inserted. Only one picture compensation mode is adopted, with a simple design. Moreover, experimental data shows that when the target frequency is selected as 65 Hz, better visual effect can be achieved and flicker sensitivity can be reduced.

A driving system of a three-dimensional liquid crystal display (3D LCD) device comprises a display driver module driving an LCD panel of the 3D LCD device using a target frequency, the target frequency is double of the monocular frequency of the input picture of the 3D LCD device, and the monocular frequency is in the range of 62 Hz-118 Hz.

In one example, the monocular frequency is 65 Hz and the exemplary target frequency is 65 Hz. As two commonly used frequency types in the prior art are 50 Hz and 60 Hz, for 50 Hz, only one frame picture is compensated for each three frames. For 60 Hz, only one frame picture is added behind each eleven frames. For 65 Hz, a smaller integer interval is used. To match the two main types, fewer pictures are inserted. Only one picture compensation mode is adopted, with a simple design. Moreover, experimental data shows that when the target frequency is selected as 65 Hz, better visual effect can be achieved and flicker sensitivity can be reduced.

Furthermore, monocular frequency of the input picture of the 3D LCD device directly received by the display driver module is in the range of 62 Hz-118 Hz, and the LCD panel is directly driven when the monocular frequency is in the range of 62 Hz-118 Hz. Thus, the display driver module (e. g. a driving circuit of time frequency and the like) does not convert the frequency of the input signal, thereby improving the response speed of the display driver module.

Furthermore, the display driver module comprises a conversion unit converting the frame rate into the target frequency. The conversion unit may convert the different frame rate into the target frequency, thereby improving usefulness.

A three-dimensional (3D) glasses is used in the driving system of the 3D liquid crystal display (LCD) device of the present disclosure, a switching frequency of the 3D glasses is equal to the monocular frequency of the input picture of the 3D LCD device.

The present disclosure adjusts the monocular frequency used for driving the LCD panel to the range of 62 Hz-118 Hz, and the output frequency of the LCD panel is in the range of 124 Hz-236 Hz under the monocular frequency being in the range of 62 Hz-118 Hz, which avoids influence of usual ambient light of 50 Hz (city frequency in mainland China) and 60 Hz (city frequency in Taiwan). When frame rate exceeds 62 Hz, the crosstalk of ambient light obviously is reduced, thereby reducing flicker sensitivity caused by ambient light. In theory, the frame rate may be infinitely great. However, because of considering a charged time of the LCD panel, it is suitable to adjust the monocular frequency of the input picture of the 3D LCD device within the range of 62 Hz-118 Hz.

DETAILED DESCRIPTION

The present disclosure provides a method for driving a three-dimensional liquid crystal display (3D LCD) device comprising:

Driving an LCD panel of the 3D LCD device according to a target frequency, the target frequency is double of a monocular frequency of input picture of the 3D LCD device, the monocular frequency being in the range of 62 Hz-118 Hz.

Figure 1:
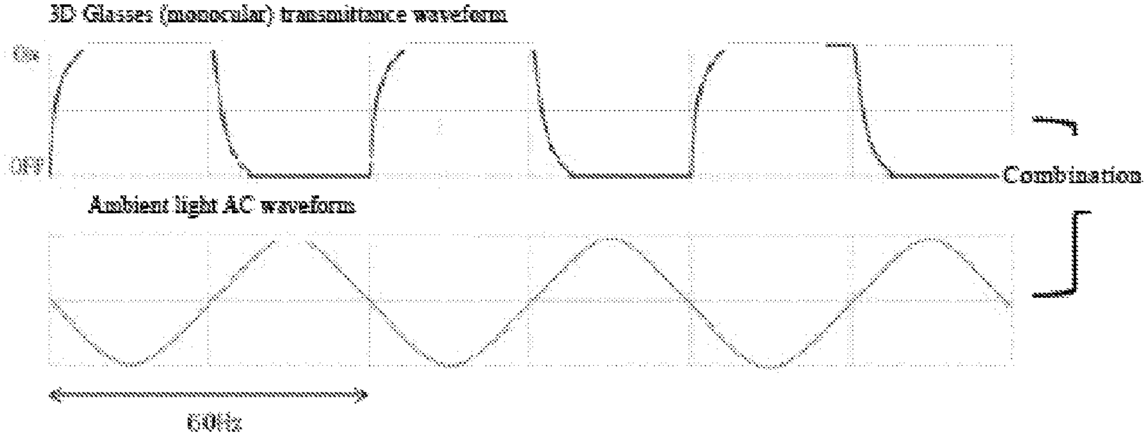
FIG. 1 (PRIOR ART)
FIG. 1 is waveform diagram of combination of switching frequency of three-dimensional glasses and wave frequency of ambient light.
Figure 2:
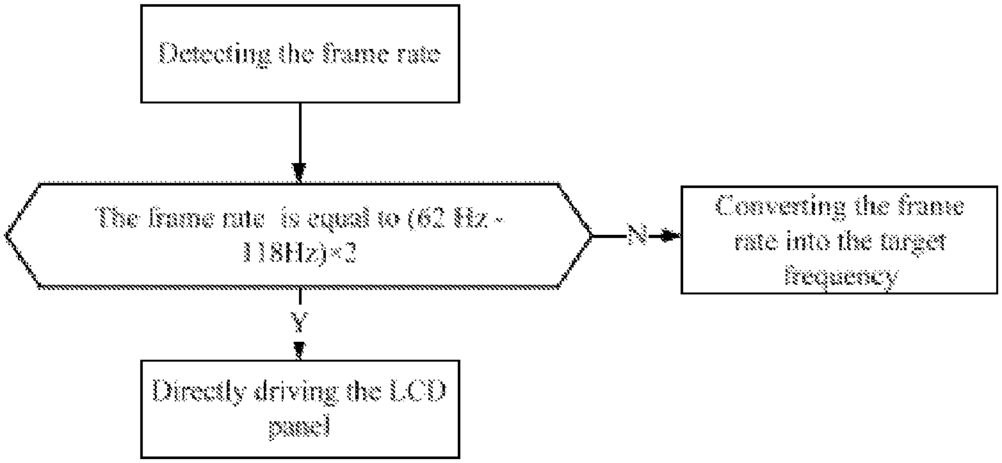
FIG. 2 is principle diagram of a method for driving a three-dimensional liquid crystal display (3D LCD) device of the present disclosure.

In order to apply to different frame rate of input picture of the 3D LCD device and improve usefulness, when the frame rate is not within range of the target frequency, the frame rate may be adjusted to the target frequency, as shown in FIG. 2.

A display driver module of the 3D LCD device may directly receive the target frequency to drive the LCD panel. In the above-mentioned condition, response speed of the display driver module (e.g. a time sequence driving circuit) improves without converting frequency of an input signal.

The monocular frequency can further be in the range of 62 Hz-72 Hz. If a low voltage differential signaling (LVDS) is unchanged in typical conditions, maximum frequency of a display driver chip of the LCD device is about 86 MHz. According to the maximum frequency of 86 MHz, the frame rate is calculated through backward induction, and maximum frame rate is about 72 Hz: 86 MHz/1050/1125=72 Hz. Thus, when the frame rate is controlled within the range of (62 Hz-72 Hz)×2, crosstalk is reduced without increasing hardware costs.

The present disclosure adjusts the monocular frequency used for driving the LCD panel to 62 Hz-118 Hz, and an output frequency of the LCD panel is in the range of 124 Hz-236 Hz under the monocular frequency being the range of 62 Hz-118 Hz. Correspondingly, switching frequency of 3D glasses is 62 Hz-118 Hz, which avoids influence of ambient light of 50 Hz (city frequency (alternating current frequency) in mainland China) and 60 Hz (city frequency (alternating current frequency) in Taiwan). When the frame rate exceeds 62 Hz, crosstalk of ambient light is obviously reduced, thereby effectively improving flicker sensitivity caused by the ambient light. In theory, the frame rate may be infinitely great. However, because of considering a charged time of the LCD panel, it is suitable to adjust the monocular frequency of the input picture of the 3D LCD devices within the range of 62 Hz-118 Hz.

Figure 9:
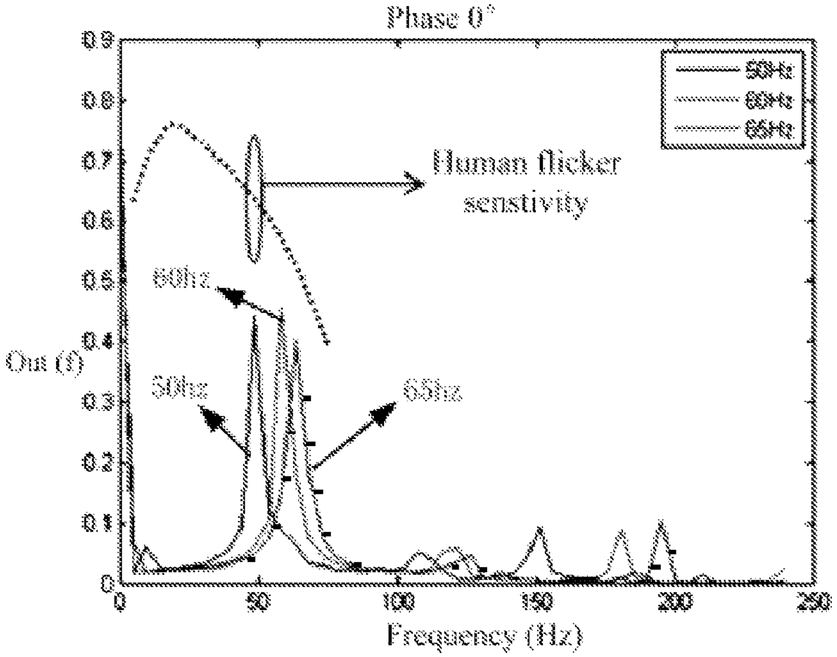
FIG. 9 is a contrast diagram of visual perceptions of signals of different frequencies.

The present disclosure is further described by taking for example of the monocular frequency of 65 Hz. A mathematical model simulation of perception frequency of eyes of users, which is generated after the combination of the ambient light of 60 Hz and the monocular frequency of 50 Hz, 60 Hz, or 65 Hz, as shown in FIG. 9. Namely, FIG. 9 is a diagram of contrasting a combination signal transformed by Fourier transform to human flicker sensitivity. The combination signal is generated by combining ambient light and panel screen lighting through the 3D glasses in different monocular frequencies.

As shown in FIG. 9, the LCD panel drove by monocular frequency of 65 Hz is slightly affected by the ambient light of 60 Hz. When the monocular frequency is combined with the ambient light, frequency position of a peak of a first lower order of the LCD panel drove by monocular frequency of 65 Hz combined is greater than frequency positions of peaks of lower orders of the LCD panels drove by monocular frequency of 50 Hz combined and monocular frequency of 60 Hz combined. And a peak value of an output value of the first lower order of the LCD panel drove by monocular frequency of 65 Hz combined is smaller than peak values of output value of first lower orders of the LCD panels drove by monocular frequency of 50 Hz combined and monocular frequency of 60 Hz combined, and for the LCD panel drove by monocular frequency of 65 Hz combined, more frequency distributions move to peaks of other higher orders. Corresponding to a curve of human flicker sensitivity, when the target frequency is 65 Hz, visual effect is better and the user flicker sensitivity is reduced. It should be considered that an influence of the LCD panel drove by the monocular frequency of 62 Hz due to the ambient light of 60 Hz is smaller than the LCD panel drove by the monocular frequency of 60 Hz, but the LCD panel drove by monocular frequency of 65 Hz is better than the LCD panel drove by monocular frequency of 62 Hz.

Data of the display frame are sent by the LVDS, maximum speed of one channel LVDS used is 80 MHz, different channels LVDS corresponding to high definition and the frame rate are following as:

HD@60 Hz=1 channel LVDS

FHD@60 Hz=2 channel LVDS

FHD@120 Hz=4 channel LVDS (I) when costs are not considered, namely number of channel of LVDS used is not limited, the frame rate may be infinitely great. When the charged time of the LCD panel is considered, the maximum frequency is about 480 Hz at present.

(II) when the number of channel of LVDS used is unchanged because of costs, maximum frequency of a typical integrated chip (IC) is about 86 MHz, which is converted into a frequency used for driving the LCD panel, and the frequency is (62 Hz-72 Hz)×2.

(III) an interface between a time sequence control chip of the LCD panel and a display driver chip is mini-LVDS, and frequency conversion of the mini-LVDS is quadruple the LVDS. Because the maximum frequency of one channel LVDS is 345 MHz, it is allowed to only consider the maximum frequency of the LVDS.

The present disclosure is further described in detail in accordance with the figures and the exemplary examples.

Figure 3:
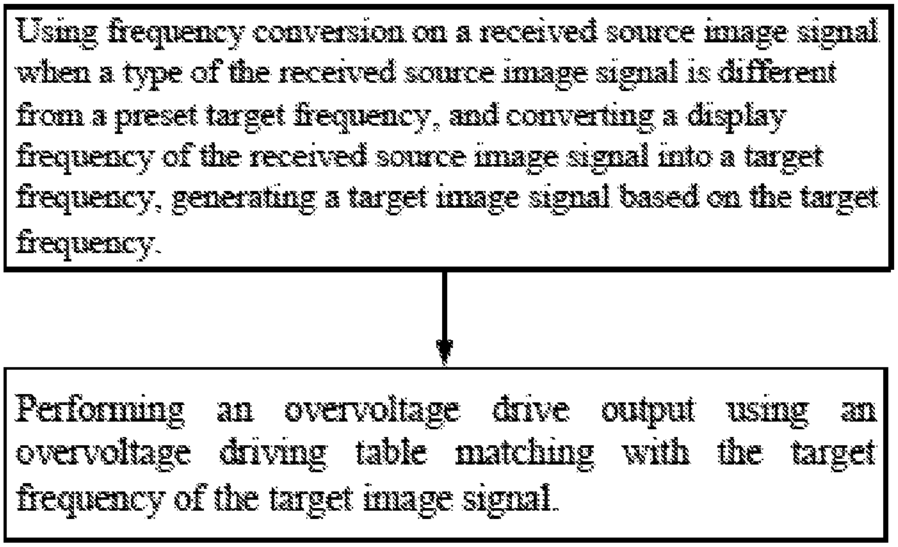
FIG. 3 is principle diagram of a method for driving a three-dimensional liquid crystal display (3D LCD) device by only using one overvoltage driving table of the present disclosure.

As shown in FIG. 3, steps of adjusting the frequency of the example comprises:

A: using frequency conversion on a received source image signal when a type of the received source image is different from a preset target frequency, and converting a display frequency of the received source image signal into a target frequency, and generating a target image signal; and B: using an overvoltage driving table matching with the target frequency of the target image signal to an overvoltage drive output.

Because deflection reaction speed of liquid crystals (LCs) of the LCD device is not high enough, display effect of the LCD device may not be optimum, so an overvoltage drive is used to accelerate reaction speed of the LCs. In the overvoltage drive, an additional voltage load is decided by a previous image state and a current image state of the LCD device. A voltage of overvoltage drive is decided by a last pixel in a previous-frame image and a first pixel in a current-frame image of the LCD device. As gray scales of different pictures are different and the voltages in the overvoltage drive are also different, an overvoltage driving table is arranged in the LCD device to conform to a corresponding overvoltage output and obtain an expected picture gray scale.

The present disclosure also provides a driving system of a three-dimensional (3D) LCD device, comprising:

A display driver module 10 driving the LCD panel using a target frequency (monocular frequency×2), the monocular frequency is in the range of 62 Hz-118 Hz.

Figure 4:
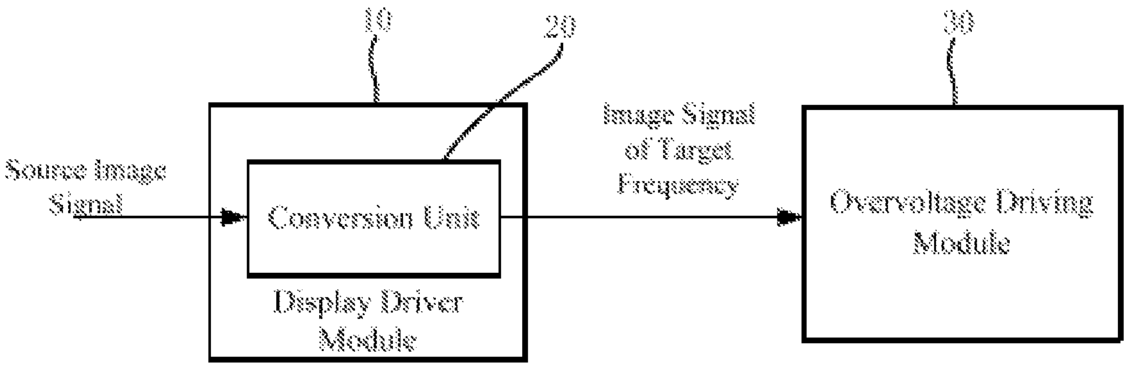
FIG. 4 is composition diagram of a driving system of a three-dimensional liquid crystal display (3D LCD) device only using one overvoltage driving table of the present disclosure.

As shown in FIG. 4, the frame rate of the display driver module 10 is equal to the target frequency, thus the display driver module does not convert the frame rate into the target frequency, thereby improving the response speed of the display driver module 10.

In order to convert the different frame rate into the target frequency, and improve the usefulness, it should be considered that the display driver module may comprise a conversion unit converting the frame rate into the target frequency.

The present disclosure also provides three-dimensional (3D) glasses used in the driving system of the 3D LCD device, where a switching frequency of the 3D glasses is equal to the monocular frequency, namely the switching frequency of the 3D glasses is half of the target frequency of the LCD panel.

The 3D glasses comprises a conversion unit 20 converting the frame rate into (62 Hz-118 Hz)×2, the conversion unit 20 may be coupled with an overvoltage driving module 30, the overvoltage driving module 30 uses one overvoltage driving table matching with the target frequency.

In the present disclosure, the source images signal having different frequency from the target frequency is converted into the new image signal having the target frequency. In this way, the LCD device only uses one overvoltage driving table to display the image signals of different frequencies without causing a poor brightness curve of the gray scales, saving a lot of memory and the cost. For a three-dimensional (3D) display device, different frequencies of a left-eye image signal and a right-eye image signal are converted into the target frequency so as to share one overvoltage driving table, which reduces flicker sensitivity and crosstalk. For a two-dimensional (2D) display device, it is suitable to image input of other frequencies, and the display device achieves a better display effect.

For the step A, if the frequency of the received source image signal is lower than the target frequency, a new frame picture is generated, and the new frame picture is inserted into the source image signal to generate a new image signal, where a frequency of the new image signal is same as the target frequency.

For the step A, if the frequency of the source image signal is greater than the target frequency, partial pictures are selected from the source image signal, and the selected partial pictures are discarded.

According to the above driving method, the present disclosure is further described by a specified example of the driving system of the LCD device.

EXAMPLE 1

Figure 5:
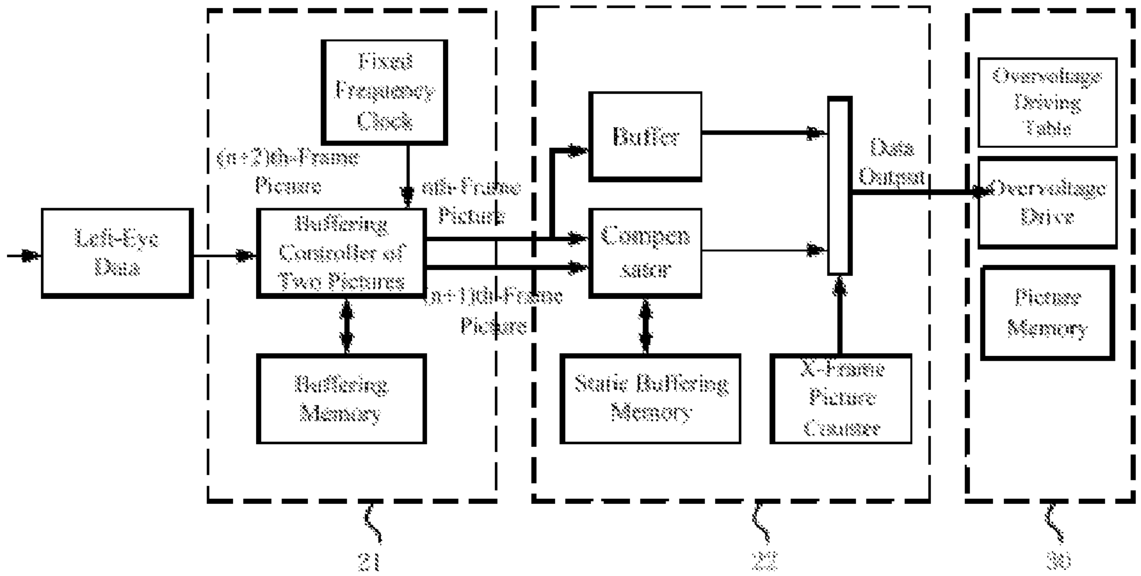
FIG. 5 is a schematic diagram of conversion of a source image signal and a system structure in a first example of the present disclosure.

As shown in FIG. 4 and FIG. 5, the driving system of the 3D LCD device comprises the conversion unit 20 and the overvoltage driving module. The conversion unit 20 comprises a buffering module 21 and a compensation module 22. The buffering module 21 is internally configured with a buffering controller of two pictures, a buffer memory connected with the buffering controller, and a fixed frequency clock. The compensation module 22 comprises a compensator, a static buffering memory, a buffer, an X-frame picture counter, and a data output port.

The first example is described by converting a left-eye source image signal of a 3D-shutter type display device of 60 Hz into a target image signal with the target frequency of 65 Hz. When the left-eye source image signal enters a buffering controller of two pictures of the buffering module 21, the fixed frequency clock is used to perform an action detection to a Nth picture and a (N+1)th picture and store the two pictures into the buffering memory. Then, the Nth picture and the (N+1)th picture are simultaneously inputted into the compensator and the buffer of the compensation module 22. A compensation picture X is generated in the compensation module 22 and stored into the static buffering memory. The pictures in the buffer are normally outputted. At this moment, the X-frame picture counter is used to control the data output port to control output of the compensation picture as needed (inserting into the source image signal). At a moment (the moment of inserting the compensation picture X, obtained by computation), the compensation picture X is inserted between the Nth picture and the (N+1)th picture and is outputted together with the Nth picture and the (N+1)th picture. Each frame picture outputted is stored in the picture memory by the overvoltage driving module 10 and is contrasted with the overvoltage driving table for image output control.

This is an example that the processed left-eye source image signal of 60 Hz enters the overvoltage drive output. For a right-eye source image signal of 50 Hz, the compensation mode is the same. Certainly, the frequencies of the left-eye signal and the right-eye signal are not limited to the numerical values cited in the example.

In the example, the new frame picture inserted into the source image signal, i.e. the compensation picture X, is a totally black picture, a totally white picture, an action detection compensation picture generated by computation, a previous-frame picture, or a next-frame picture. If the number of the pictures to be inserted is small, simple pictures, such as the totally black picture, the totally white picture, the previous-frame picture, or the next-frame picture can be selected. If the number of the pictures to be inserted is large, the action detection compensation picture generated by computation can be selected so as to obtain a better display effect.

Figure 6:
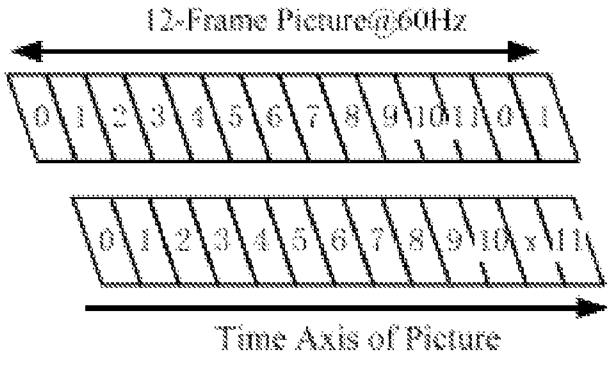
FIG. 6 is a schematic diagram of conversion of a left-eye source image signal in a first example of the present disclosure.
Figure 7:
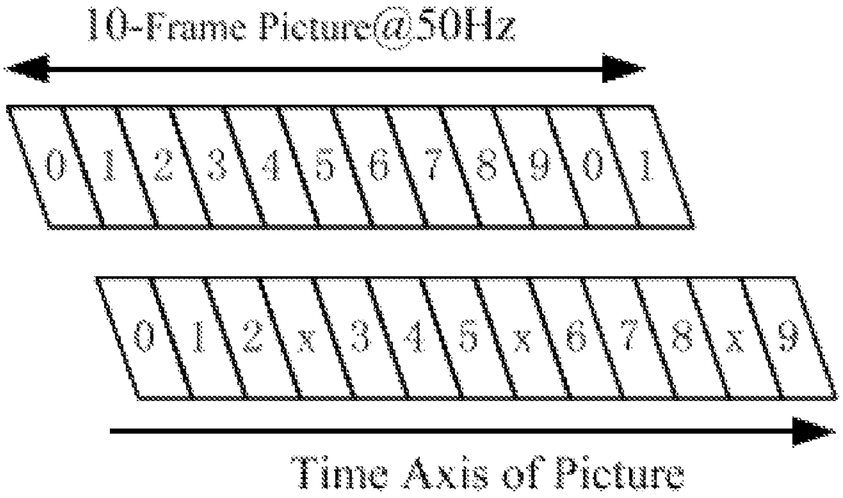
FIG. 7 is a schematic diagram of conversion of a right-eye source image signal in a first example of the present disclosure.
Figure 8:
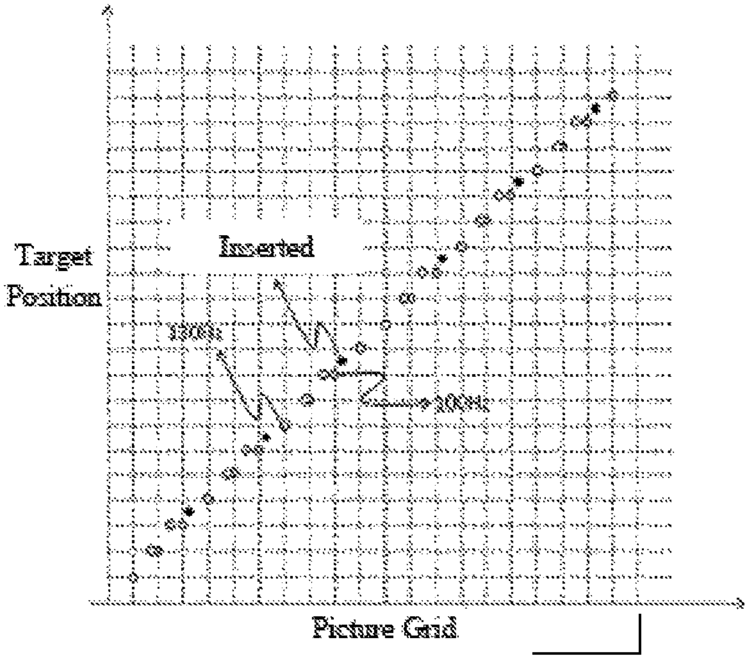
FIG. 8 is a signal fluctuation chart after converting an image signal in a first example of the present disclosure.

In the example, the number of compensation pictures X to be inserted is selected according to a difference between the frequency of the source image signal and the target frequency. The insertion chance can be even, random, or in a given point. As shown in FIG. 6, if the left-eye source image signal of 60 Hz is converted into a new image signal of the target frequency of 65 Hz, five-frame compensation pictures X are inserted. In the example, a mode that new frame pictures are evenly inserted among the frame pictures of the source image signal is used in one frequency cycle of the source image signal, namely one compensation picture X is inserted behind each eleven-frame picture of the source image signal. As shown in FIG. 7, if the right-eye source image signal of 50 Hz is converted into the new image signal of the target frequency of 65 Hz, fifteen-frame pictures are inserted. Thus, one compensation picture X is inserted behind each 3-frame picture which is in each 10-frame picture. The evenly inserted mode enables picture display to be smoother. As shown in FIG. 8, a movement curve after compensation slightly shakes, but is not obvious under 3D view. As two commonly used frequency type signals, 50 Hz and 60 Hz, are selected in the example, and because the numbers 50 and 60 are a common divisor of five, to better evenly insert the matching compensation pictures, the target frequency is preferably a common divisor of five. In the example, the selected 65 Hz is just the common divisor of five. Alternatively, the target frequency can also be 55 Hz. However, two modes need to be used to change the frequency of the source image signal into the target frequency. One mode is to compensate the pictures, and the other mode is to discard the pictures. Thus, design difficulty and the cost are increased. For 65 Hz, a smaller integer interval is selected, and only the mode to compensate the picture is used. Thus, there are fewer pictures to be inserted to match the two main types.

The present disclosure converts the frame rate into (62 Hz-118 Hz)×2. Using easy animation detection and compensation, the present disclosure converts an original frame rate of monocular into 62 Hz-118 Hz, then outputs the picture, the original frame rate of monocular is 50 Hz or 60 Hz. Under the frame rate being in the range of 62 Hz-118 Hz, an output frequency of the LCD panel is in the range of 124 Hz-236 Hz, namely (62 Hz-118 Hz)×2=124 Hz-236 Hz, and the switching frequency of the 3D glasses is in the range of 62 Hz-118 Hz corresponding to the output frequency of the LCD panel being in the range of 124 Hz-236 Hz, which avoids influence of usual ambient light of 50 Hz (city frequency (alternating current frequency) in mainland China) and 60 Hz (city frequency (alternating current frequency) in Taiwan). When the frame rate exceeds 60 Hz, the crosstalk of the ambient light is obviously reduced, thus reducing flicker sensitivity caused by the ambient light. In the present disclosure, reducing flicker sensitivity caused by the ambient light is achieved by only adjusting an output time sequence of the LCD panel other circuits of the LCD panel, which is easy to upgrade, reduces difficulty degree of reformations, and reduces costs. In theory, the frame rate may be infinitely great. However, because of considering the charged time of the LCD panel and one picture displayed by two frames of left eye and right eye, it is suitable to adjust the monocular frequency drove by the LCD panel within the range of 62 Hz-118 Hz.

In the example, frame pictures are compensated to the source image signal so as to achieve the target frequency corresponding to the overvoltage driving module 30, so that the overvoltage driving module 30 can correctly perform overvoltage drive. The target frequency is greater than 45 Hz so that human eyes may not experience the flicker sensitivity. Certainly, the target frequency is preferably greater than 60 Hz so that better effect is achieved when viewing by human eyes.

EXAMPLE 2

The difference between a first example and a second example is that the left-eye source image signal is a sixty frames and the target frequency is 55 Hz. Thus, the processing mode of the source image signal is to discard five frames of pictures so as to be consistent with the target frequency. At this moment, the five frames of pictures in the source image signal are removed by a compensation module. Certainly, the removal mode is even extraction from one frequency cycle of the source image signal, i.e. sixty frames pictures. Or, one frame picture is evenly extracted every several pictures to be discarded. The right-eye signal has the same processing mode, namely corresponding frame pictures are added or reduced.

EXAMPLE 3

The type of the source image signal and the frequency of target image signal in the first example and the second example are defined. Thus, signal determination is not needed.

Figure 10:
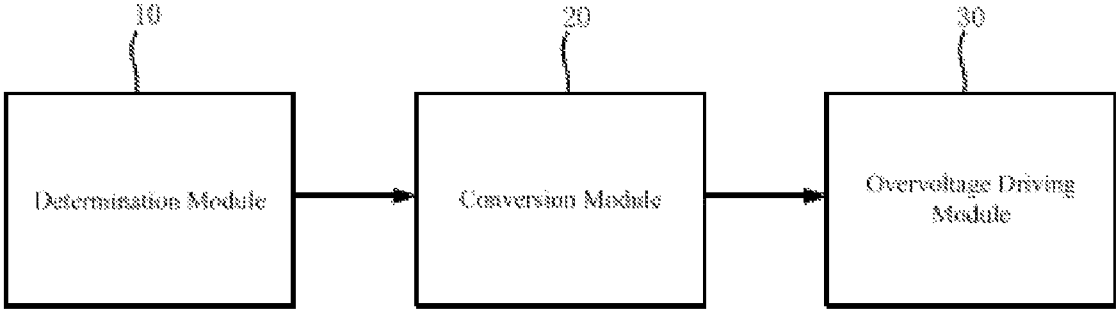
FIG. 10 is a composition diagram of a driving system of a three-dimensional liquid crystal display (3D LCD) device in a third example of the present disclosure.

For the example, a determination module of the image signals is added, so that one overvoltage driving table needed to perform drive output to different source image signals. As shown in FIG. 10, the driving system of the LCD device comprises a determination module 10, the conversion module 20, and the overvoltage driving module 30. The driving process is shown as follows:

A: determining whether a type of a received source image signal needs a frequency conversion, if yes, converting a display frequency of received source image signal into the target frequency, generating a target image signal based on the target frequency. Otherwise, the source image signal is the target image signal; and B: using an overvoltage driving table matching with the target frequency of the target image signal to an overvoltage drive output.

EXAMPLE 4

The present disclosure balances display effect by inserting and compensating the picture after converting the monocular frequency into the target frequency, to obtain better display effect, the target frequency may elect different numerical values, an analysis is following as:

Factoring of 50 Hz and 60 Hz is achieved:

$$50=2\times5^2$$

$$60=2^2\times3\times5$$

According to the above-mentioned equation, 2 and 5 are common factors of 50 and 60, so the frame rate having the common factors may be obtained by inserting and compensating the picture, such as 62 Hz, 64 Hz, 65 Hz, 66 Hz, 68 Hz, 70 Hz, and 72 Hz.

Taking a example for 70 Hz.

$$50=10\times5$$

$$60=10\times6$$

$$70=10\times7$$

When the original monocular frequency is 50 Hz, each five frames pictures is regarded as a unit, and two frames compensation pictures are inserted behind each five frames pictures to generate a picture of 70 Hz.

When the original monocular frequency is 60 Hz, each six frames pictures is regarded as a unit, and one frame compensation picture is inserted behind each six frames pictures to generate the picture of 70 Hz.

It should be consider that if the monocular frequency of the input picture of the 3D LCD device received by the display driver module is in the range of 60 Hz-118 Hz, the frequency is not need to be adjusted, and the LCD panel may be directly derived by the frequency.

The present disclosure is described in detail in accordance with the above contents with the specific exemplary examples. However, this present disclosure is not limited to the specific examples. For example, if the frequency of the source image picture is consistent with the target frequency, no processing is required in the compensation module. For the ordinary technical personnel of the technical field of the present disclosure, on the premise of keeping the conception of the present disclosure, the technical personnel can also make simple deductions or replacements, and all of which should be considered to belong to the protection scope of the present disclosure.

We claim:

1. A method for driving a three-dimensional liquid crystal display (3D LCD) device, comprising:

driving an LCD panel of the 3D LCD device according to a target frequency, wherein the target frequency is double of a monocular frequency of an input picture of the 3D LCD device, and wherein the monocular frequency being in the range of 62 Hz-118 Hz.

2. The method for driving the 3D LCD device of claim 1, further comprising:

converting a frame rate of the input picture of the 3D LCD device into the target frequency.

3. The method for driving the 3D LCD device of claim 1, wherein monocular frequency of the input picture of the 3D LCD device directly received by a display driver module of the 3D LCD device is in the range of 62 Hz-118 Hz, and the LCD panel is directly driven when the monocular frequency is in the range of 62 Hz-118 Hz.

4. The method for driving the 3D LCD device of claim 3, wherein the monocular frequency is in the range of 62 Hz-72 Hz.

5. The method for driving the 3D LCD device of claim 4, wherein the monocular frequency is 65 Hz.

6. The driving system of a three-dimensional liquid crystal display (3D LCD) device, comprising:

a display driver module driving an LCD panel according to a target frequency, the target frequency being double of a monocular frequency of an input picture of the 3D LCD device, wherein the monocular frequency is in the range of 62 Hz-118 Hz.

7. The driving system of the 3D LCD device of claim 6, wherein the monocular frequency is 65 Hz.

8. The driving system of the 3D LCD device of claim 6, wherein monocular frequency of the input picture of the 3D LCD device directly received by the display driver module of the 3D LCD device is in the range of 62 Hz-118 Hz, and the LCD panel is directly driven when the monocular frequency is in the range of 62 Hz-118 Hz.

9. The driving system of the 3D LCD device of claim 6, wherein the display driver module comprises a conversion unit converting a frame rate of the input picture of the 3D LCD device into the target frequency.

10. A three-dimensional (3D) glasses of a driving system of a 3D liquid crystal display (LCD) device, wherein the driving system of the 3D LCD device uses a target frequency that is double of a monocular frequency of an input picture of the 3D LCD device and wherein the monocular frequency of the input picture is in the range of 62 Hz-118 Hz;

and wherein a switching frequency of the 3D glasses is equal to the monocular frequency of the input picture of the 3D LCD device.

11. The method for driving the 3D LCD device of claim 1, wherein the monocular frequency is in the range of 62 Hz-118 Hz.

12. The method for driving the 3D LCD device of claim 11, wherein the monocular frequency is 65 Hz.

13. The method for driving the 3D LCD device of claim 2, wherein the monocular frequency is in the range of 62 Hz-118 Hz.

14. The method for driving the 3D LCD device of claim 13, wherein the monocular frequency is 65 Hz.

15. The 3D glasses of claim 10, wherein the monocular frequency is 65 Hz.

16. The 3D glasses of claim 15, wherein a display driver module receives the monocular frequency of the input picture of the 3D LCD device being in the range of 62 Hz-118 Hz, and directly drives an LCD panel of the 3D LCD device.

17. The 3D glasses of claim 16, wherein the display driver module comprises a conversion unit converting the frame rate of the input picture of the 3D LCD device into the target frequency.

* * * * *